United States Patent
Heidasch et al.

(10) Patent No.: US 8,205,120 B2
(45) Date of Patent: Jun. 19, 2012

(54) INTELLIGENT TEST FRAMEWORK

(75) Inventors: Robert Heidasch, Eochendorffstr (DE); Albert Rossmann, Muhlstr (DE)

(73) Assignee: SAP AG, Walldorf (DE)

( * ) Notice: Subject to any disclaimer, the term of this patent is extended or adjusted under 35 U.S.C. 154(b) by 402 days.

(21) Appl. No.: 11/963,783

(22) Filed: Dec. 21, 2007

(65) Prior Publication Data
US 2009/0164848 A1    Jun. 25, 2009

(51) Int. Cl.
*G06F 11/00*    (2006.01)
(52) U.S. Cl. .................. 714/45; 714/25; 714/48
(58) Field of Classification Search .......... 714/38, 714/45, 36, 2, 25, 48
See application file for complete search history.

(56) References Cited

U.S. PATENT DOCUMENTS

| | | | |
|---|---|---|---|
| 2003/0023900 A1* | 1/2003 | Smith et al. | 714/25 |
| 2003/0131283 A1* | 7/2003 | Ur et al. | 714/36 |
| 2005/0166094 A1* | 7/2005 | Blackwell et al. | 714/38 |
| 2005/0198622 A1* | 9/2005 | Ahluwalia et al. | 717/130 |
| 2006/0271824 A1* | 11/2006 | Kwong et al. | 714/38 |
| 2007/0094198 A1* | 4/2007 | Loh | 706/47 |
| 2008/0059843 A1* | 3/2008 | Sato et al. | 714/45 |
| 2008/0126828 A1* | 5/2008 | Girouard et al. | 714/2 |
| 2008/0126862 A1* | 5/2008 | Pyska et al. | 714/28 |
| 2008/0155339 A1* | 6/2008 | Lowe et al. | 714/38 |
| 2009/0063903 A1* | 3/2009 | Smolski | 714/38 |

* cited by examiner

*Primary Examiner* — Scott Baderman
*Assistant Examiner* — Sarai Butler
(74) *Attorney, Agent, or Firm* — Mintz, Levin, Cohn, Ferris, Glovsky, and Popeo, P.C.

(57) ABSTRACT

A system and method for testing an application or component is disclosed. A debugging agent connects to the application or component to monitor one or more test processes on the application or component according to a template-based configuration. A test framework defines the template-based configuration for the debugging agent, creates test input data for the application or component for use by the one or more test processes, and starts the execution of the one or more test processes. The test framework is further adapted to record test output data from the one or more test processes.

20 Claims, 3 Drawing Sheets

INTELLIGENT TEST FRAMEWORK

BACKGROUND

This disclosure relates generally to computer systems, and more particularly to an intelligent test framework for testing computer applications and/or components.

Application and/or component testing is one of the most important activities to guarantee software quality. Testing is typically done using a test program, which is a program that initializes and controls the execution of particular functionality. However, current solutions for testing software do not fully check the test results and/or internal states in order to guarantee proper application or component functionality. Existing solutions further require instrumentation and/or modification of the application code in order to perform tests, and test data must be defined in the code of the test program, despite the fact that many times, such data is unavailable.

SUMMARY

This document discloses an intelligent test framework that enables test data to be defined, and the test results and internal application or component states to be recorded, without any programming effort or modification to the application itself.

The test data and test results (test output as well as internal data) can be saved as "reference" test data, i.e. and can be used later to initialize a next test and detect problems. After the test is executed, the test framework compares the current test data/results with "reference" test data/results and reports the problems errors with its detail description.

The intelligent test framework is a code-free test framework, in which input and output proxies are generated and internal test data is created or determined using a debugging agent with use template-based configuration. Test trace data generated by the intelligent test framework uses a debugging agent for debug granularity to control the internal state of the tested application or component. The debugging agent provides a set of "soft" breakpoints, which means that all process information is available for the test evaluation. The intelligent test framework allows for the testing of applications/components without instrumentation of any test program. The instrumentation is done using template-based configurations, which can be configured to automatically set new breakpoints in the application or component code, and easily reconfigured for activation by the debugging agent.

In one aspect, a system for testing an application or component is disclosed. The system includes a debugging agent that connects to the application or component to monitor one or more test processes on the application or component according to a template-based configuration. The system further includes a test framework that defines the template-based configuration for the debugging agent, creates test input data for the application or component for use by the one or more test processes, and starts the execution of the one or more test processes. The test framework is further adapted to record test output data from the one or more test processes.

In another aspect, a method for testing an application or component is presented. The method includes the steps of generating test input data for a test process to test the application or component, and generating a configuration of the test process based on a template. The method further includes executing the test process according to the configuration and based on the test input data to generate test output data and tracing data of the test process run by the application or component.

In yet another aspect, a system for testing an application or component is disclosed, and includes a debugging agent that monitors one or more test processes on the application or component according to a template-based configuration, and which generates tracing data from the execution of the one or more test processes. The system further includes a test framework that defines the template-based configuration for the debugging agent, creates test input data for the application or component for use by the one or more test processes, and starts execution of the one or more test processes. The test framework is further adapted to store test output data and tracing data from the one or more test processes.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes an intelligent test framework for testing an application or component. The intelligent test framework can be deployed without any programming effort or modification to the application itself, and enables test data to be defined and the test results and internal application or component states to be recorded, to significantly simplify the testing.

Figure 1:
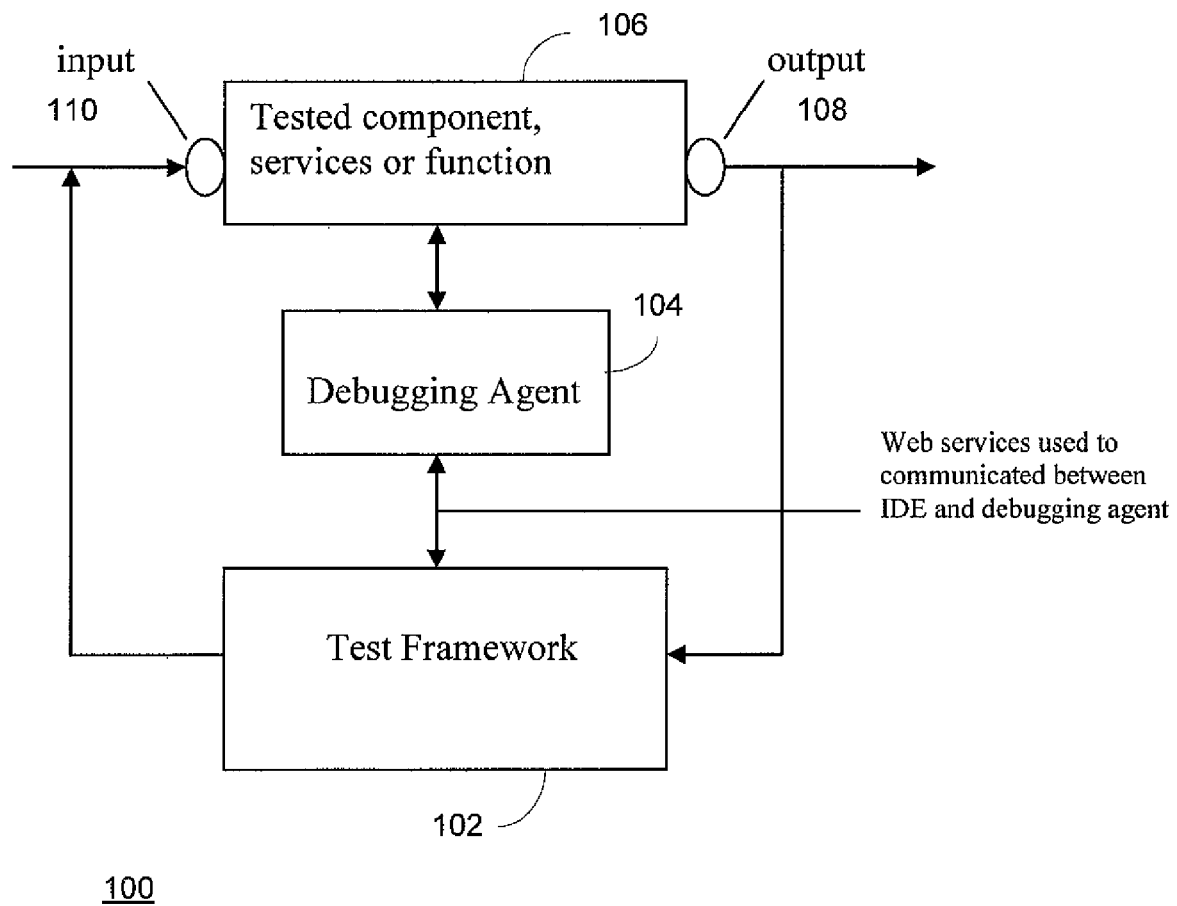
FIG. 1 is a block diagram of an intelligent test framework.

FIG. 1 is a block diagram of a general architecture of an intelligent test framework 100. The intelligent test framework includes two main elements: a test framework 102 and a debugging agent 104, which communicate with each other to test an application or component 106. The application or component 106 can include any services or function of an application or component thereof.

The test framework 102 is a program that controls the testing of the application or component 106. The test framework performs the following functions; creating test data (the test input data); defining template-based configuration for the debugging agent 104 (based on a debugging client and "soft" breakpoint functionality that allows configurable tracing of an executed process), obtaining the test result (test output data) and tracing data (from debugging agent 104), and recording test data (test input data), test results (test output data) and internal application or component data (tracing data) for the creation of "reference" test data and/or results.

The debugging agent 104 is a program that connects to the running process (e.g. Java process running on a Java Virtual Machine (Java VM), ABAP process running on an ABAP application server, C# process running on a Microsoft Common Runtime, etc.) that executes a particular test of the application or component. After connection to the running process, the debugging agent 104, as a platform-specific agent or program (operating system and runtime or process), controls the execution of the particular running test process. Additionally, use of the test framework 102 requires generation of an input proxy 110 and an output proxy 108 that insert the test data (input) and obtain the test result (output), respectively.

Figure 2:
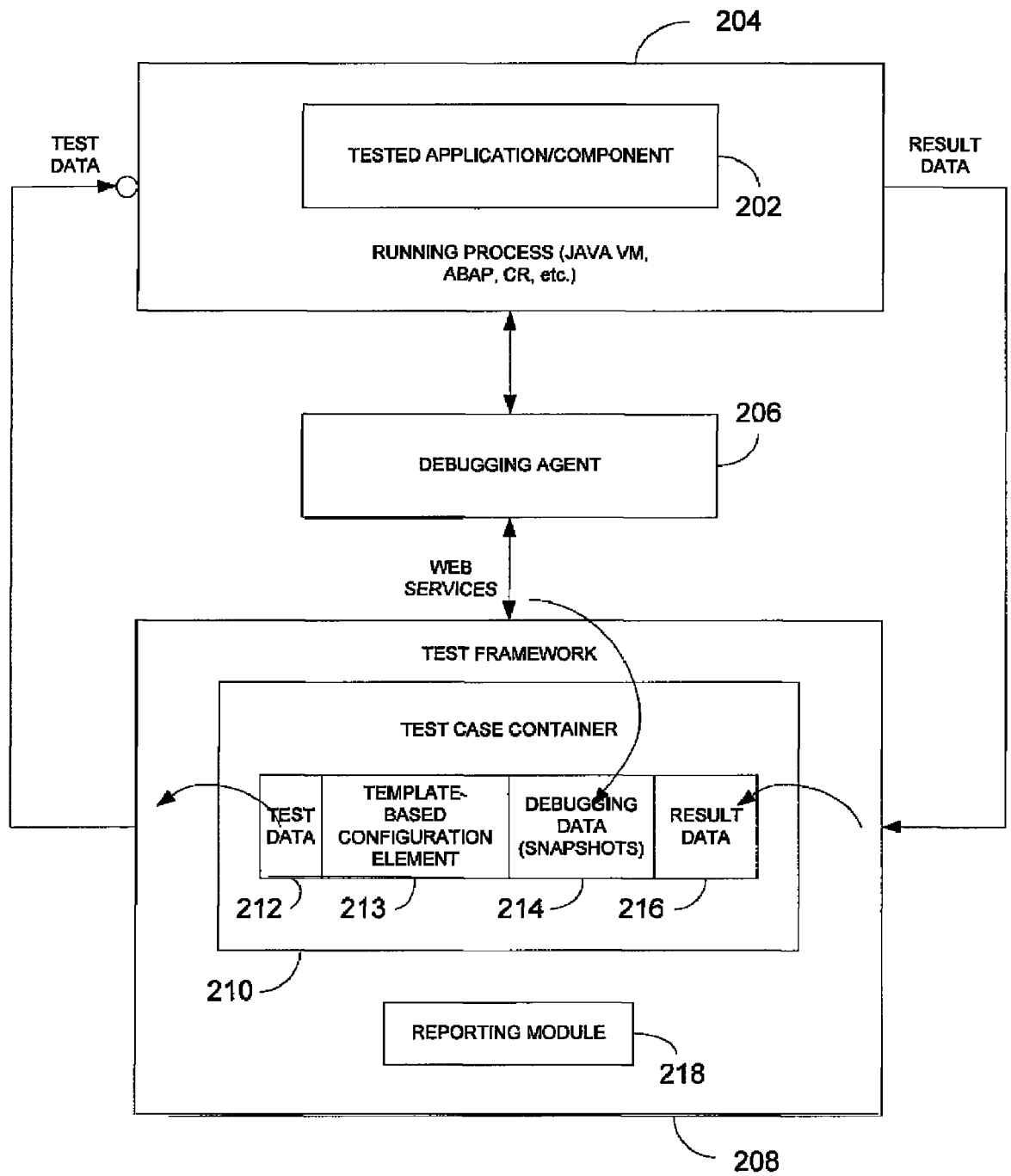
FIG. 2 is a block diagram of an implementation of an intelligent test framework.

Referring now to FIG. 2, an alternative implementation of an intelligent test framework 200 is shown. The intelligent test framework 200 is configured to test an application or component in a running test process 204, and record the results. The intelligent test framework 200 includes a debugging agent 206 and a test framework 208. The test framework 208 includes a test case container 210 associated with the running process 204 testing the application or component 202. The intelligent test framework 200 further includes a reporting module 218 for automated notification of test results, i.e. via electronic mail, messaging or via HTTP to a portal.

The test case container 210 includes one or more tables, each storing test data 212, template-based configuration elements 213, debugging data 214 and result data 216 as master data. These data are also used as "reference" data in cases where other APIs are called, or if the template is changed. Accordingly, subsequent runs of tests can be compared to the master reference data to see if the application or component 202 functions in the same way, i.e., the current debugging data from the debugging agent 206 is compared to the master debugging data 214, the result data from the running process 204 is compared with the master result data 216, etc. The reference data can be automatically updated in any manner. The template-based configuration element 213 is transferred from the test framework 208 to the debugging agent 206 before the test process starts.

The debugging agent 206 activates the running process template, sets breakpoints in the code, and obtains debugging data as tracing data. The debugging agent 206 provides the debugging data to the test framework 208 without stopping the execution of the process (e.g. execution of Java process, ABAP process, etc.) using an intelligent, extended tracing with debugging information granularity. The tracing data can be obtained even the process 204 or system is not running "offline" Web services-based communication can be used to obtain trace data.

Figure 3:
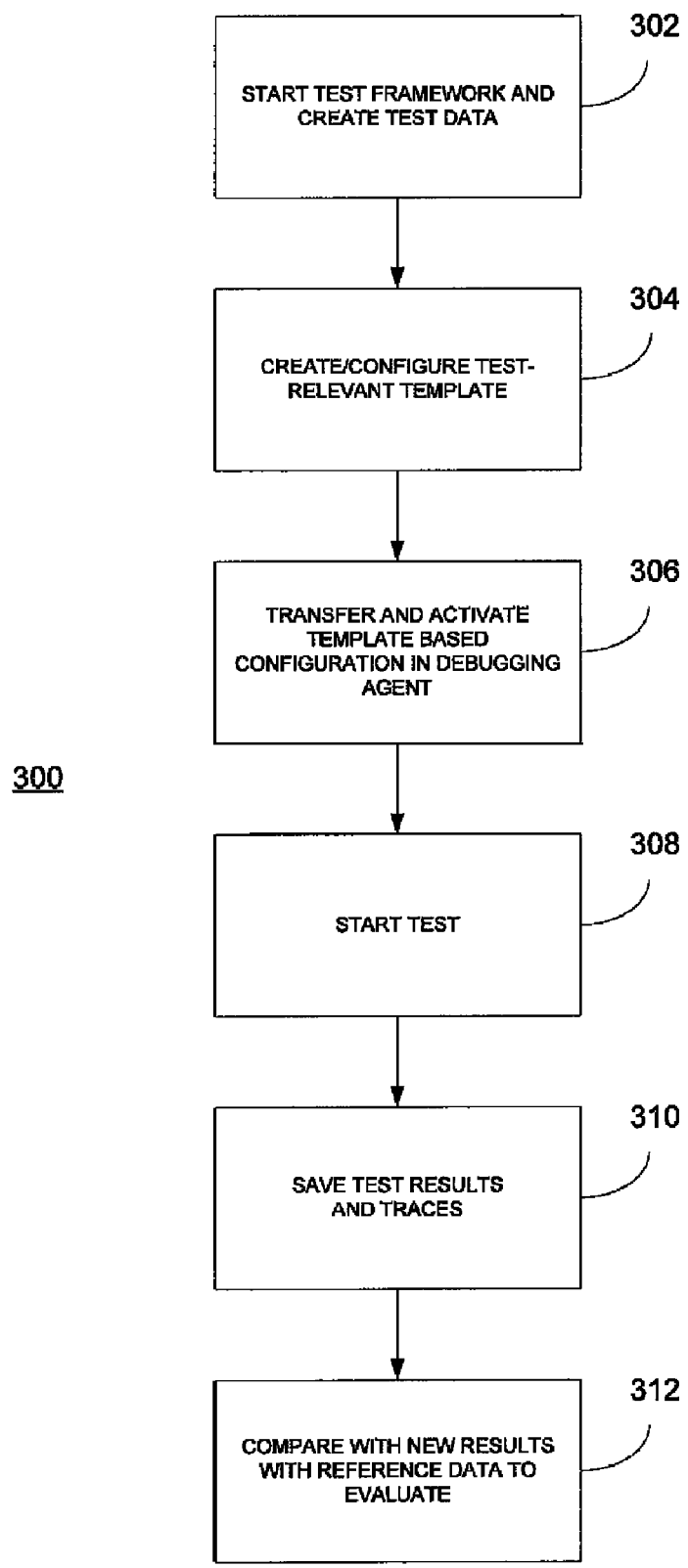
FIG. 3 is a flowchart of a method for testing an application or component.

FIG. 3 is a flowchart of a method 300 of an intelligent test framework operation. At 302, the test framework is started and the test data is created. The test data includes test input data that are required to start the application or component test. At 304, the test-relevant template is created and configured. The code editor for the debugging agent can be used to define "soft" breakpoints that form the internal test checkpoints. At 306, the template-based configurations are transferred to the debugging agent and activated.

At 308, the test is started. At 310, test results (test output data) and traces (from the debugging agent) are saved, and stored in a container as a master data set. At 312, the test results and traces can be defined as "reference" test data, or the test results and traces can be compared with previously defined "reference" data to evaluate the test results. The test data and test results (output data and trace data) can be recorded and used to define/create the "reference" test data. The last "reference" data are used automatically to evaluate the test results. This means the current test results will be compared with "reference" data, and the intelligent test framework then reports the test status and detail (e.g. detailing differences and a description).

The intelligent test framework system and method can be used for all applications or components, e.g. functions, Web services, etc. The system and method employ an asynchronous debugging solution, preferably using Web services, and a template-based debugging configuration to instrument the test application or component to test the internal functionality without code modification. Finally, the system and method use "reference" data to evaluate the test results—an intelligent, and configurable set of test results selected to report test status.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A system for testing an application or component out of a plurality of applications or components, the system comprising:
    a processor-based debugging agent that connects to the application or component to execute one or more test processes that test the application or component, the one or more test processes configured according to a template-based configuration that is specific to the application or component such that the one or more test processes are represented by a combination of the template-based configuration and a testing code that is common for the plurality of applications or components, the common testing code being unmodified for different applications or components of the plurality of applications or components; and
    a processor-based test framework that defines the template-based configuration to be incorporated in the one or more processes along with the testing code provided by the debugging agent, creates test input data for the application or component for use by the one or more test processes, and starts the execution of the one or more test processes, the test framework further adapted to record test output data from the one or more test processes, wherein:
        the application or component is running when the debugging agent connects to the application or component, the debugging agent being implemented on a first set of one or more processors and the application or component being implemented on a second set of one or more processors before the debugging agent connects to the application or component, the first set of one or more processors being remote from the second set of one or more processors, the test framework being implemented on a third set of one or more processors that are remote from the first set of one or more processors and the second set of one or more processors,
        the debugging agent is configured to control the executing one or more test processes after the start of the execution of the one or more test processes by the test framework,
        an inbound proxy is generated to insert test data from the test framework into the application or component, and
        an outbound proxy is generated to output test data from the application or component to the test framework.

2. The system of claim 1, wherein:
    the test framework further comprises a reporting module that reports test result data based on the test output data; and
    the test output data is being recorded while the one or more processes are being executed.

3. The system of claim 1, wherein the test framework is further adapted to compare the test output data with reference test result data to generate new test result data.

4. The system of claim 3, wherein the test framework is further adapted to store the test result data in a test case container, the test case container comprising test data, at least one template-based configuration element, debugging data, and result data.

5. The system of claim 1, wherein the debugging agent is adapted to trace an internal state of the application or component during the execution of the one or more test processes, the traced internal state being used to generate tracing data.

6. The system of claim 5, wherein the debugging agent is further adapted to transmit the tracing data to the test framework.

7. The system of claim 6, wherein the test framework is further adapted to store the tracing data as at least part of reference test results, against which test output data from one or more subsequent test processes is compared.

8. The system of claim 1, wherein the test framework defines the one or more test processes by generating soft breakpoints in the template-based configuration.

9. The system of claim 1, wherein the debugging agent and test framework communicate via Web services.

10. The system of claim 7, wherein the test framework is further adapted to store test input data and test output data with the tracing data in a test case container.

11. The system of claim 1, wherein: the first set of one or more servers are implemented on a first central processing unit that is separate from a second central processing unit that implements the second set of one or more servers; and
the test framework is an integrated development environment that is connected to the debugging agent using one or more web services.

12. A method for testing an application or component, the method comprising:
generating, at a test framework implemented on a first set of one or more processors, test input data for a test process to test the application or component implemented on a second set of one or more processors, the second set of one or more processors being remote from the first set of one or more processors such that the test framework connects with a processor-based debugging agent that further connects, using one or more web services, with the application or component, the debugging agent connecting with the application or component when the application or component has been running; wherein the debugging agent being implemented on a third set of one or more processors that are remote from the first set of one or more processors and the second set of one or more processors; generating a configuration of the test process based on a template specific to the application or the component, the test process being represented by a combination of the template and a testing code that is common for applications or components including the application or component being tested; and executing the test process according to the configuration and based on the test input data to generate test output data and tracing data of the test process run at the application or component, the execution of the test process being controlled by the processor-based debugging agent after start of the execution of the test process.

13. The method of claim 12, further comprising storing the test output data, tracing data and test input data associated with the test process.

14. The method of claim 13, further comprising defining reference test data from the stored test output data, tracing data and test input data.

15. The method of claim 14, further comprising:
executing a subsequent test process; and
comparing test output data, tracing data and test input data associated with the subsequent test process with the reference test data to generate subsequent test result data.

16. The method of claim 15, further comprising reporting, through a network, test results of the subsequent test process according to the subsequent test result data.

17. A system for testing an application or component, the system comprising:
a processor-based debugging agent that executes one or more test processes that test the application or component, the one or more test processes configured according to a template-based configuration that is specific to the application or component such that the one or more test processes are represented by a combination of the template-based configuration and a testing code that is common for the plurality of applications or components, the common testing code being unmodified for different applications or components of the plurality of applications or components, the debugging agent generating tracing data from the execution of the one or more test processes; wherein the debugging agent being implemented on a first set of one or more processors and the application or component being implemented on a second set of one or more processors, the first set of one or more processors being remote from the second set of one or more processors; and a processor-based test framework that defines the template-based configuration, creates test input data for the application or component for use by the one or more test processes, and starts execution of the one or more test processes, the test framework further being adapted to store test output data and tracing data from the one or more test processes, wherein the debugging agent is configured to control the executing one or more test processes after the start of the execution of the one or more test processes by the test framework, the test framework being implemented on a third set of one or more processors that are remote from the first set of one or more processors and the second set of one or more processors; wherein: the test framework defines reference test data from the stored test output data and tracing data, the reference data comprising master test data, template-based configuration elements, master debugging data, and master result data;
debugging data obtained from the debugging agent is compared to the master debugging data; result data from a running process is compared to the master result data; the template-based configuration element is transferred, using one or more web services, from the test framework to the debugging agent before a test process commences.

18. The system of claim 17, wherein the test framework defines the one or more test processes by generating soft breakpoints in the template-based configuration which are transferred to the debugging agent.

19. The system of claim 18, wherein the test framework executes one or more subsequent test processes on the application or component, and wherein the debugging agent generates subsequent test output data and subsequent tracing data.

20. The system of claim 19, wherein the test framework is further adapted to compare the subsequent test output data and subsequent tracing data with the stored reference test output data and tracing data to generate test result data for the one or more subsequent test processes.

* * * * *